US012496040B2

(12) United States Patent
Lee et al.

(10) Patent No.: US 12,496,040 B2
(45) Date of Patent: Dec. 16, 2025

(54) DIAGNOSIS SYSTEM USING ATTACHABLE PATCH TYPE ULTRASONIC TRANSDUCER

(71) Applicants: KOREA INSTITUTE OF SCIENCE AND TECHNOLOGY, Seoul (KR); KOREA UNIVERSITY RESEARCH AND BUSINESS FOUNDATION, Seoul (KR)

(72) Inventors: Byung Chul Lee, Seoul (KR); Kyung-Hee Cho, Seoul (KR)

(73) Assignees: KOREA INSTITUTE OF SCIENCE AND TECHNOLOGY, Seoul (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 105 days.

(21) Appl. No.: 18/070,799

(22) Filed: Nov. 29, 2022

(65) Prior Publication Data
US 2023/0210495 A1 Jul. 6, 2023

(30) Foreign Application Priority Data
Jan. 6, 2022 (KR) .................. 10-2022-0002067

(51) Int. Cl.
*A61B 8/00* (2006.01)
*A61B 8/08* (2006.01)

(52) U.S. Cl.
CPC .......... *A61B 8/4236* (2013.01); *A61B 8/0883* (2013.01); *A61B 8/4488* (2013.01); *A61M 2205/18* (2013.01)

(58) Field of Classification Search
CPC ... A61B 8/4236; A61B 8/0883; A61B 8/4488; A61B 8/5223; A61B 8/0891;
(Continued)

(56) References Cited

U.S. PATENT DOCUMENTS

2012/0065479 A1* 3/2012 Lahiji ................. A61B 8/4427
600/459
2012/0281895 A1* 11/2012 Chono ................. G06T 7/0012
382/128

(Continued)

FOREIGN PATENT DOCUMENTS

JP 2010-110373 A 5/2010
JP 2014-54580 A 3/2014
(Continued)

OTHER PUBLICATIONS

Choi, Jeong-Yoon, et al. "Left ventricular wall motion abnormalities are associated with stroke recurrence." *Neurology* vol. 88. Issue 6 (2017). pp 586-594.
(Continued)

*Primary Examiner* — Alexei Bykhovski
(74) *Attorney, Agent, or Firm* — NSIP Law

(57) ABSTRACT

An ultrasonic diagnosis system according to an embodiment of the present disclosure includes a plurality of ultrasonic output patches configured to be attachable to different body parts, a data receiving unit configured to receive data transmitted from the plurality of ultrasonic output patches, a processing unit configured to acquire an imaging result related to the body part by processing the data, and an output unit configured to output the imaging result related to the body part, in which the ultrasonic output patch includes a multichannel ultrasonic transducer array configured to output imaging ultrasonic waves toward the body part and receive the reflected ultrasonic waves, a signal processing module configured to process a signal transmitted to or received from the multichannel ultrasonic transducer array, and a communication module configured to transmit a signal processing result, which is acquired by the signal processing module, to the data receiving unit.

5 Claims, 7 Drawing Sheets

(58) Field of Classification Search
CPC ... A61B 8/4427; A61B 8/4477; A61B 8/4455; A61B 8/06; A61B 8/0808; A61B 8/4472; A61M 2205/18
See application file for complete search history.

(56) References Cited

U.S. PATENT DOCUMENTS

| | | | |
|---|---|---|---|
| 2015/0289854 A1* | 10/2015 | Cho | H05K 1/0204 600/463 |
| 2019/0059848 A1* | 2/2019 | Owen | A61B 8/4281 |
| 2021/0085280 A1* | 3/2021 | Van Heesch | A61B 8/488 |
| 2021/0391069 A1* | 12/2021 | Leinfellner | G16H 10/60 |
| 2022/0047245 A1 | 2/2022 | Lee et al. | |
| 2023/0020596 A1 | 1/2023 | Sakaguchi et al. | |
| 2023/0086770 A1 | 3/2023 | Lee et al. | |

FOREIGN PATENT DOCUMENTS

| | | |
|---|---|---|
| JP | 2018-538100 A | 12/2018 |
| JP | 2020-537580 A | 12/2020 |
| KR | 10-2017-0136674 A | 12/2017 |
| KR | 10-2020-0107665 A | 9/2020 |
| KR | 10-2215276 B1 | 2/2021 |
| KR | 10-2021-0153903 A | 12/2021 |
| KR | 10-2022-0021250 A | 2/2022 |
| WO | WO 2008/042559 A2 | 4/2008 |
| WO | WO 2017/109080 A1 | 6/2017 |
| WO | WO 2019/077598 A1 | 4/2019 |
| WO | WO 2021/014171 A2 | 1/2021 |
| WO | WO 2021/199968 A | 10/2021 |

OTHER PUBLICATIONS

Choi, Jeong-Yoon, et al. "Left ventricular wall motion abnormality is associated with cryptogenic stroke." *International Journal of Stroke* vol. 15. Issue 2 (2020). pp 188-196.

Japanese Office Action issued on May 19, 2025 in corresponding Japanese Patent Application No. 2024-540902. (3 pages in English and 3 pages in Japanese).

* cited by examiner

[FIG. 1]
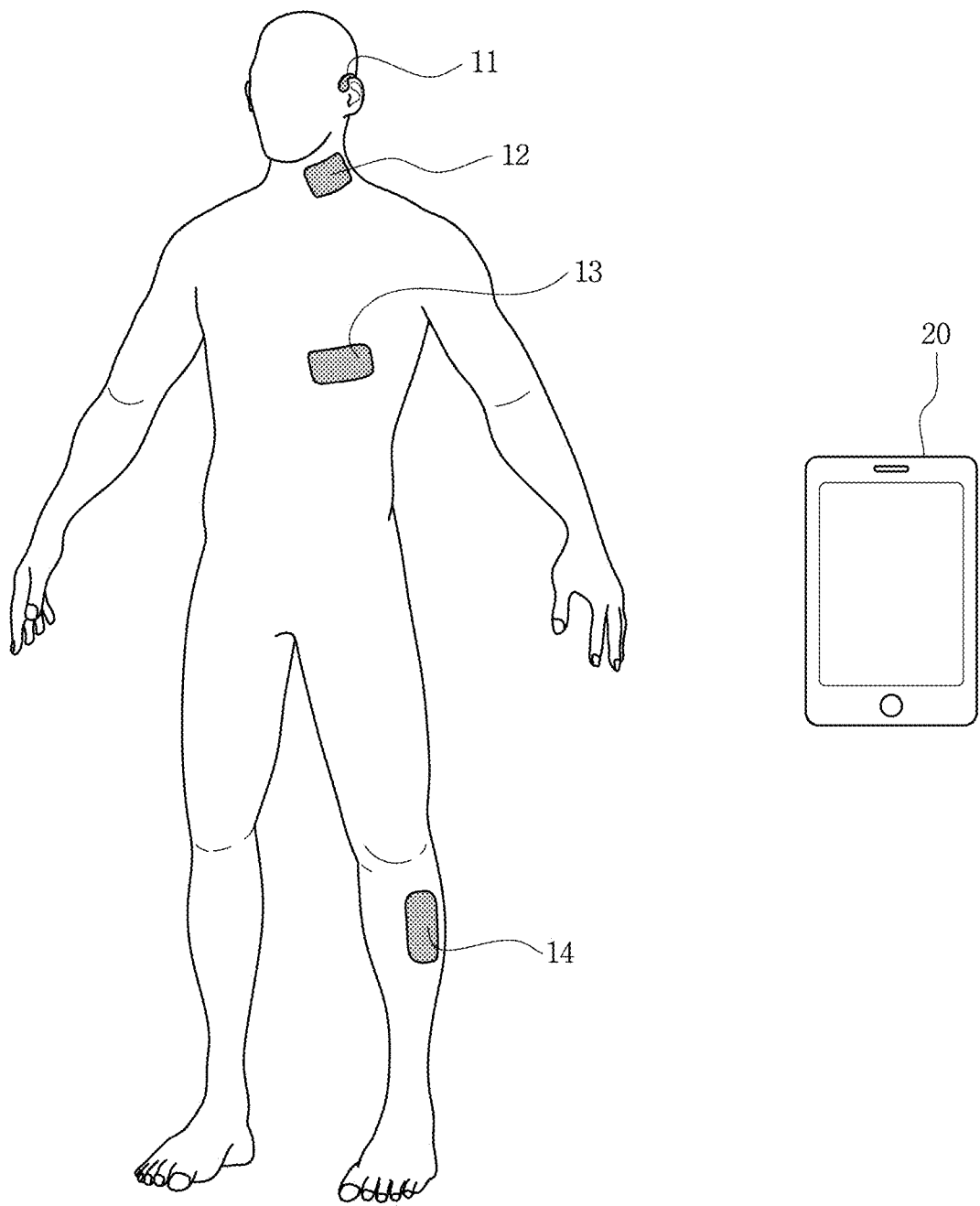

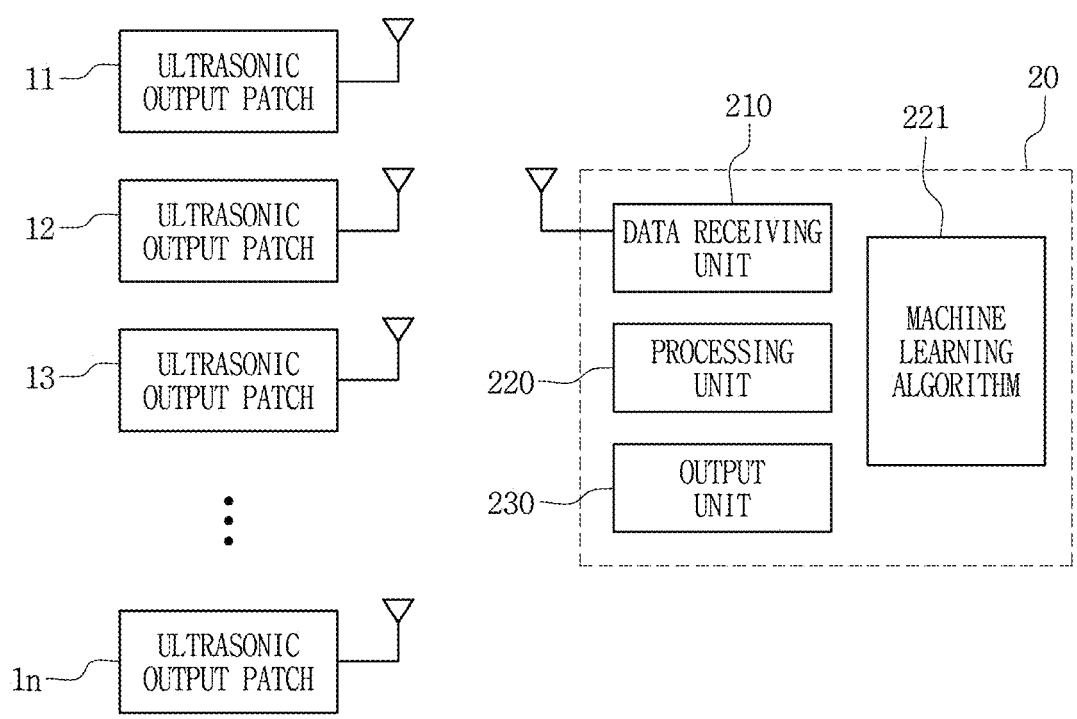
[FIG. 2]

[FIG. 3]
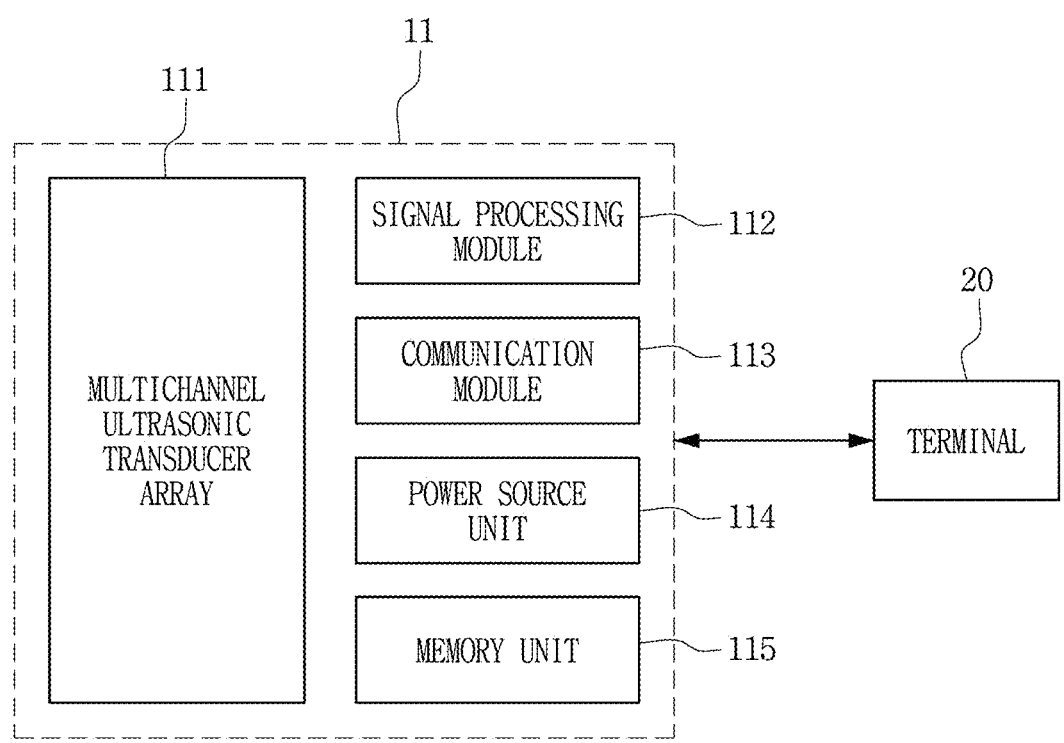

[FIG. 4]
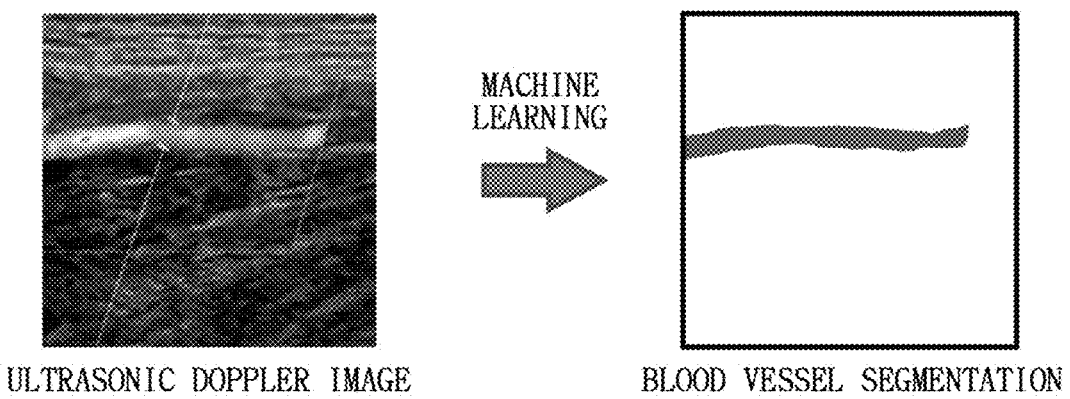
ULTRASONIC DOPPLER IMAGE → MACHINE LEARNING → BLOOD VESSEL SEGMENTATION

[FIG. 5]
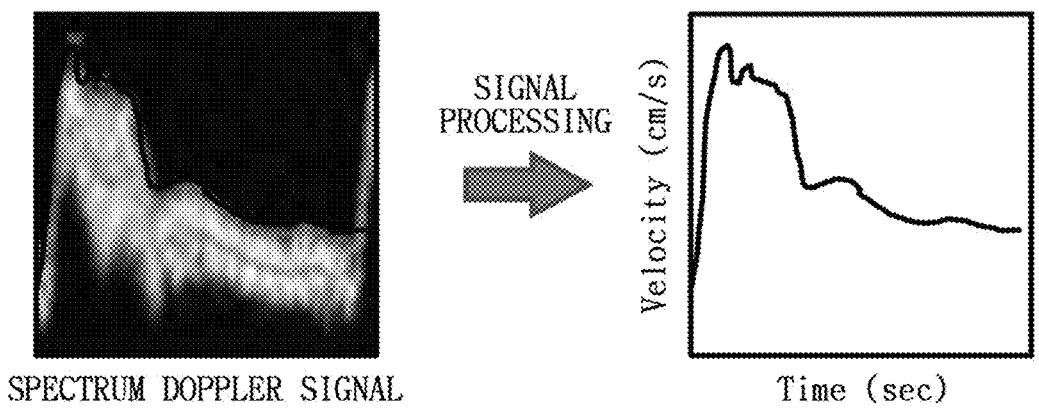

[FIG. 6]
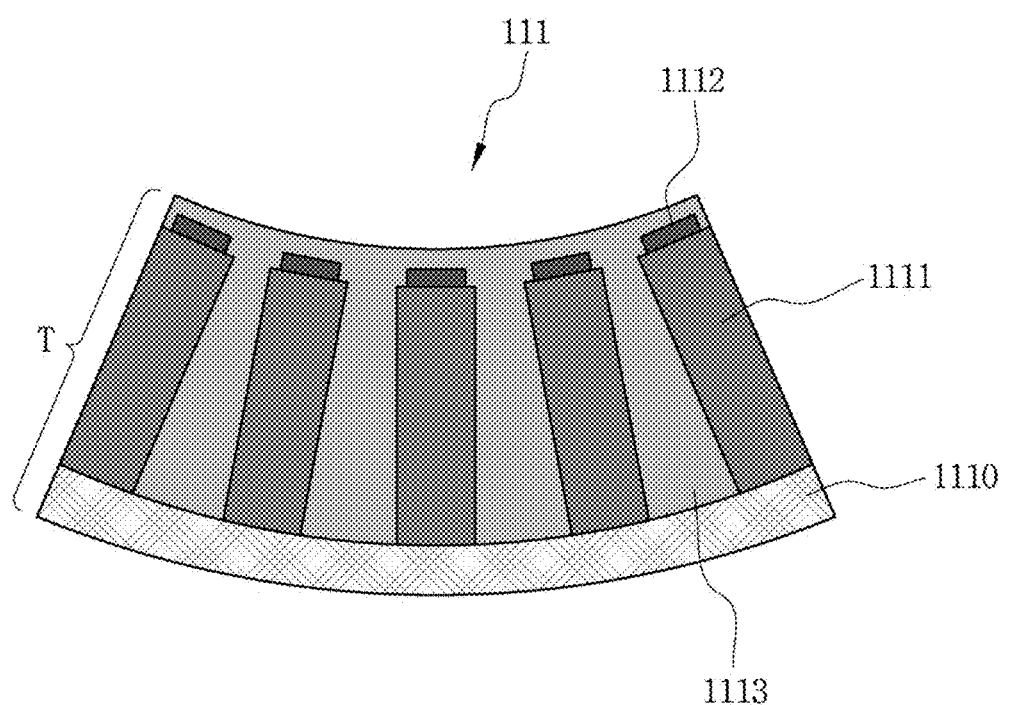

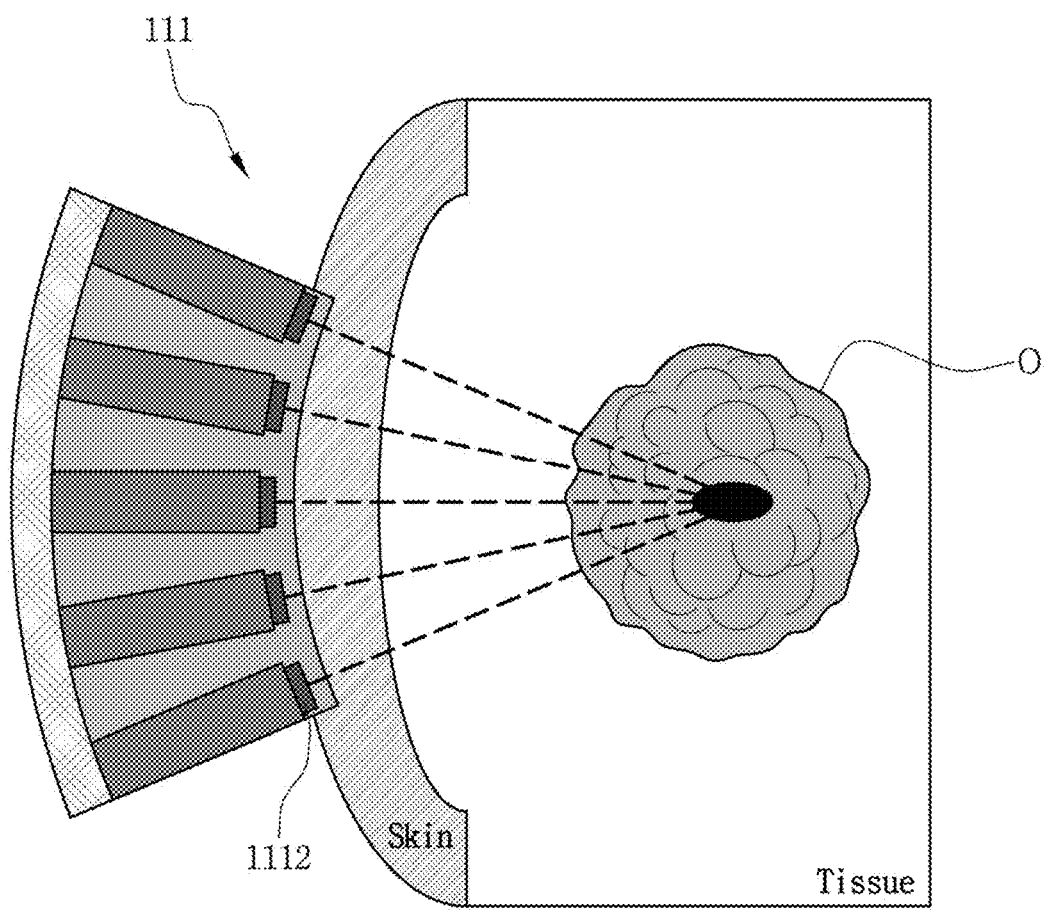
[FIG. 7]

DIAGNOSIS SYSTEM USING ATTACHABLE PATCH TYPE ULTRASONIC TRANSDUCER

CROSS REFERENCE TO RELATED APPLICATION

The present application claims priority to Korean Patent Application No. 10-2022-0002067, filed Jan. 6, 2022, the entire contents of which is incorporated herein for all purposes by this reference.

BACKGROUND OF THE INVENTION

Field of the Invention

The present disclosure relates to a diagnosis system using an attachable patch type ultrasonic transducer, and more particularly, to a system that acquires a result of imaging respective body parts by using patch type ultrasonic transducers attached to the different body parts and diagnoses a disease based on the imaging result.

DESCRIPTION OF NATIONAL SUPPORT RESEARCH AND DEVELOPMENT

This study was supported by the Korean Ministry of Trade, Industry, and Energy (Project Name: DEVELOPMENT OF CAPACITIVE MICRO-MACHINED ULTRASONIC TRANSDUCER FOR MR COMPATIBLE MULTIMODAL IMAGING AND TREATMENT, Project Number: 1711138070).

DESCRIPTION OF THE RELATED ART

Cerebral infarction refers to a state in which a cerebral blood vessel is clogged (a canal constituting a blood vessel is blocked), the amount of blood supplied to a brain decreases, and cerebral tissue cannot appropriately perform a function thereof or is necrosed.

The cerebral infarction is directly related to a decrease in blood flow rate in the cerebral blood vessel. However, according to the research result, patients with cerebral infarction often also have blood vessel diseases in other organs as well as diseases in the cerebral blood vessels. For example, a research result shows that a rate of relapse of cerebral apoplexy becomes higher by 1.7 times when left ventricular wall motion abnormality (LVWMA) occurs according to a result of performing echocardiography on a patient with cerebral apoplexy. It is possible to predict that the patient with cerebral apoplexy is likely to have an arteriosclerotic disease by finding out the LVWMA even though the patient with cerebral apoplexy has an unknown cerebral infarction.

As described above, because the incidence rates of the cerebral infarction, the cardiac infarction, and the arteriosclerotic disease are highly related to one another, it is possible to increase a likelihood of diagnosis and prevention of the cerebral infarction by considering images of blood vessels of other organs as well as CT/MRI images of cerebral blood vessels of patients. However, CT/MRI imaging techniques, which scan a plurality of body parts at once, are not easy to use at ordinary times because of high cost and adverse effects caused by radiation exposure. Therefore, in the case of a patient who is highly likely to have a blood vessel disease, it may be further preferred to monitor, at ordinary times, a vascular condition by using an ultrasonic diagnosis system capable of causing almost no adverse effect and acquiring images of blood vessels in real time.

An ultrasonic diagnosis system in the related art is used to observe a lesion by bringing an ultrasonic probe (a device for acquiring an image by using a pulse-echo signal between transmitted and received ultrasonic waves) into contact with a part to be evaluated. However, because a practitioner needs to directly hold the probe with a hand and move the probe, it is difficult to observe the lesion for a long period of time. In addition, different machines need to be used to check several body parts to collectively test the body parts, which may complicate the test and also cause an incorrect test result.

Accordingly, there is a need for a technology capable of collectively diagnosing blood vessel diseases by simultaneously applying an ultrasonic diagnosis system to several body parts, the ultrasonic diagnosis system being capable of causing almost no adverse effect and performing real-time monitoring.

DOCUMENT OF RELATED ART (Patent Document 1) Korean Patent Application No. 10-2020-0101870

SUMMARY OF THE INVENTION

The present disclosure has been made in an effort to provide a diagnosis system that may acquire images of body parts (a transcranial part, a carotid artery, a heart, a peripheral artery, etc.) by applying attachable ultrasonic output patches to body parts and determine the presence or absence of a disease based on a result of imaging the body part.

A diagnosis system using an attachable ultrasonic output patch according to an embodiment of the present disclosure includes: a plurality of ultrasonic output patches configured to be attachable to different body parts; a data receiving unit configured to receive data transmitted from the plurality of ultrasonic output patches; a processing unit configured to acquire an imaging result related to the body part by processing the data; and an output unit configured to output the imaging result related to the body part, in which the ultrasonic output patch includes: a multichannel ultrasonic transducer array configured to output imaging ultrasonic waves toward the body part and receive the reflected ultrasonic waves; a signal processing module configured to process a signal transmitted to or received from the multichannel ultrasonic transducer array; and a communication module configured to transmit a signal processing result, which is acquired by the signal processing module, to the data receiving unit.

According to the embodiment, the multichannel ultrasonic transducer array may be integrated on a substrate made of a flexible material bendable to conform to a curved shape of the body part.

According to the embodiment, the processing unit may acquire an intravascular imaging result related to the body part by using a machine learning algorithm.

According to the embodiment, the processing unit may determine the presence or absence of a disease based on the intravascular imaging result related to the body part.

According to the embodiment, the processing unit may determine the presence or absence of a disease based on at least one of a blood flow rate, a blood pressure, an aging degree of a blood vessel, and heart rate variability measured by using the intravascular imaging result related to the body part.

According to the embodiment, the output unit may output a warning message related to the disease when the processing unit determines that the disease is present.

According to the embodiment, the processing unit may determine the presence or absence of a disease by collectively considering the intravascular imaging result related to the body part and an intravascular imaging result of a body part different from the body part.

According to the embodiment, the different body parts may be transcranial parts, carotid artery parts, heart parts, or peripheral artery parts.

According to the embodiment of the present disclosure, it is possible to simultaneously acquire images of several body parts (a transcranial part, a carotid artery, a heart, a peripheral artery, and the like) by using attachable ultrasonic output patches and output the images to a terminal, and it is possible to determine the presence or absence of a vascular disease, such as cerebral infarction, cardiac infarction, or arteriosclerosis, or predict a likelihood of the disease by individually or collectively considering imaging results related to the body parts.

BRIEF DESCRIPTION OF THE DRAWINGS

To clearly explain the technical solutions of the embodiments of the present disclosure or the related art, the drawings required for the description of the embodiments are briefly introduced below. It should be understood that the flowing drawings are intended to explain the embodiments of the present specification but not to limit the embodiments of the present specification. In addition, for the clarity of the description, the expression of some components of the drawing may be exaggerated or omitted.

FIG. 1 is a view illustrating a state in which ultrasonic output patches according to an embodiment are attached to several body parts of a patient.

FIG. 2 is a view illustrating a configuration of a diagnosis system using the attachable ultrasonic output patch according to the embodiment.

FIG. 3 is a view illustrating a configuration of the attachable ultrasonic output patch according to the embodiment.

FIG. 4 is a view illustrating a process of extracting a blood vessel segmentation image from an ultrasonic doppler image by using a machine learning-based processing system according to the embodiment.

FIG. 5 is a view illustrating a process of acquiring blood flow velocity information by processing a spectrum doppler signal by using a signal processing system according to the embodiment.

FIG. 6 is a view illustrating a cross-section of a multi-channel ultrasonic transducer array constituting the attachable ultrasonic output patch according to the embodiment.

FIG. 7 is a view illustrating a state in which the multi-channel ultrasonic transducer array illustrated in FIG. 6 comes into contact with the body part and outputs imaging ultrasonic waves toward a target position.

DETAILED DESCRIPTION OF THE INVENTION

The following detailed description of the present disclosure will be made with reference to the accompanying drawings illustrating specific exemplary embodiments for carrying out the present disclosure. These exemplary embodiments will be described in detail enough to carry out the present disclosure by those skilled in the art. It should be understood that various exemplary embodiments of the present disclosure are different from one another but need not be mutually exclusive. For example, particular shapes, structures, and characteristics described herein in respect to one exemplary embodiment may be implemented in other exemplary embodiments without departing from the spirit and scope of the present disclosure. In addition, it should be understood that the position or arrangement of each constituent element in the respective disclosed exemplary embodiments may be changed without departing from the spirit and scope of the present disclosure. Therefore, the following detailed description is not considered as having limited meanings, and the scope of the present disclosure, if adequately explained, is limited only by the appended claims as well as all the scopes equivalent to the appended claims. Like reference numerals in the drawings refer to the same or similar functions throughout several aspects.

The terms used in the present specification are selected from general terms currently widely used in the art in consideration of functions, but the terms may vary according to the intention of those skilled in the art, practice, or new technology in the art. Further, specified terms are selected arbitrarily by the applicant, and in this case, the detailed meaning thereof will be described in the description of the present specification. Thus, the terms used in the present specification should be defined based on not simple names but the substantial meaning of the terms and the overall description of the present specification.

In addition, the embodiments disclosed in the present specification may have a configuration that is hardware as a whole, hardware partially, software partially, or software as a whole. In the present specification, the term "unit," "module," "device," "server," or "system" may refer to computer-related entity such as hardware, software, or a combination of hardware and software. For example, the term "unit," "module," "device," "server," or "system" may refer to hardware, which constitutes a part or the entirety of a platform, and/or software such as an application (application) for operating the hardware.

Hereinafter, exemplary embodiments of a diagnosis system using an attachable ultrasonic output patch will be described in detail with reference to the drawings.

FIG. 1 is a view illustrating a state in which ultrasonic output patches according to an embodiment are attached to several body parts. Referring to FIG. 1, ultrasonic output patches 11, 12, 13, and 14 are attached to different body parts (a transcranial part, a carotid artery part, a heart part, a peripheral artery part, and the like) to acquire ultrasonic images of the body parts. Signal data acquired by the ultrasonic output patches are transmitted to a terminal 20 through wireless communication. The terminal 20 acquires a result of ultrasonic imaging for the body parts based on the signal data and outputs the result of ultrasonic imaging.

FIG. 2 is a view illustrating a configuration of a diagnosis system using the attachable ultrasonic output patch according to the embodiment. Referring to FIG. 1, a diagnosis system according to an embodiment includes a plurality of ultrasonic output patches 11, 12, 13, . . . , and 1n, and the terminal 20 configured to communicate with the ultrasonic output patches 11, 12, 13, . . . , and 1n in a wireless manner. The terminal 20 includes a data receiving unit 210 configured to receive data transmitted from the plurality of ultrasonic output patches 11, 12, 13, . . . , and 1n, a processing unit 220 configured to acquire an imaging result related to the body part by processing the data, and an output unit 230 configured to output the imaging result related to the body part.

The plurality of ultrasonic output patches 11, 12, 13, ... , and 1n may each be provided in the form of a thin patch capable of being attached to different body parts, but the shape of the ultrasonic output patch is not limited to a particular shape. In addition to the thin patch, the ultrasonic output patch may be provided in the form of a wearable device such as a band or a ring that may be worn on the body part.

FIG. 3 is a view illustrating a configuration of the attachable ultrasonic output patch according to the embodiment. Referring to the configuration of the single ultrasonic output patch 11, the ultrasonic output patch 11 includes: a multichannel ultrasonic transducer array 111 configured to output imaging ultrasonic waves toward the body part and receive reflected ultrasonic waves; a signal processing module 112 configured to process signals transmitted from and received by the multichannel ultrasonic transducer array 111; a communication module 113 configured to transmit a signal processing result, which is acquired by the signal processing module 112, to the data receiving unit 210 of the terminal 20; a power source unit 114 configured to supply electric power to constituent elements of the ultrasonic output patch 11; and a memory unit 115 configured to store or read out data required to operate the ultrasonic output patches 11.

The multichannel ultrasonic transducer array 111 may have a structure in which a plurality of ultrasonic transducer elements is arranged in the form of a one-dimensional or two-dimensional array, and output strength and phases of the ultrasonic transducer elements may be controlled by independent channels. The ultrasonic transducer elements may each be, but not limited to, an ultra-small ultrasonic transducer such as a capacitive micro-machined ultrasonic transducer (CMUT) or a piezoelectric micro-machined ultrasonic transducer (PMUT). Various ultrasonic transducer elements such as an ultrasonic transducer using an electromagnetic force or photoacoustic effect may be used.

The ultrasonic transducer elements each output high-frequency ultrasonic waves for imaging toward the body part (specifically, a portion, such as a lesion in the body, a blood vessel, or tissue to be monitored), receive ultrasonic waves returned by being reflected by the body part, and transmit the ultrasonic signals to the signal processing module 112.

The signal processing module 112 acquires electronic data by processing the transmitted or received ultrasonic signal. In addition, the signal processing module 112 may serve to control an operation of the multichannel ultrasonic transducer array 111 or control an operation of the communication module 113. The ultrasonic signal processing data may be stored in the memory unit 115.

The communication module 113 transmits data, which are acquired by the signal processing module 112, or data, which are stored in the memory unit 115, to the data receiving unit 210, which is embedded in the external terminal 20, through wireless communication. Furthermore, the communication module 113 may receive, in a wireless manner, external data, such as a control signal of the ultrasonic output patch 11, from the terminal 20. As the wireless communication method, it is possible to use any technology such as short-distance wireless communication such as Bluetooth, Wi-Fi, ZigBee, or the like, long-distance wireless communication using electromagnetic waves, and optical communication.

According to the embodiment, the communication module 113 is not embedded in the ultrasonic output patch 11. The communication module 113 may be configured to receive, in a wired manner, data from the plurality of ultrasonic output patches 11, 12, 13, ..., and 1n connected in a wired manner, and communicate with the external terminal 20 in a wireless manner.

Referring back to FIG. 2, the terminal 20 refers to a device that may communicate with the external device in a wireless manner and include a processor capable of computing and processing data, and an input/output device for providing an interaction interface with a user. The terminal may be a smartphone, a PC, a tablet, a wearable smart device, or the like, but the terminal is not limited to a particular device. The constituent elements to be described below may be included in a single device or included in other devices connected to one another.

The data receiving unit 210 receives data transmitted from the plurality of ultrasonic output patches 11, 12, 13, ..., and 1n through wireless communication. As the wireless communication method, it is possible to use any technology such as short-distance wireless communication such as Bluetooth, Wi-Fi, ZigBee, or the like, long-distance wireless communication using electromagnetic waves, and optical communication.

The processing unit 220 acquires the imaging result related to the body parts (specifically, a lesion in the body, a blood vessel, or tissue to be monitored) by processing the transmitted and received ultrasonic data. According to the embodiment, the processing unit 220 may acquire an intravascular imaging result related to the body parts by using a machine learning algorithm 221.

FIG. 4 is a view illustrating a process of extracting a blood vessel segmentation image from an ultrasonic doppler image by using a machine learning-based processing system according to the embodiment. As illustrated, a blood vessel segmentation image (right) may be acquired by extracting feature points from an ultrasonic doppler image (left) and separating the background and the foreground. It is possible to find out symptoms that are criteria of diagnosis of diseases such as an aging degree of a blood vessel or a degree to which a blood vessel is clogged with reference to a size of the blood vessel shown in the blood vessel segmentation image.

FIG. 5 is a view illustrating a process of acquiring blood flow velocity information by processing a spectrum doppler signal by using a signal processing system according to the embodiment. As illustrated, it is possible to acquire blood flow velocity information (right) according to a time flow based on a spectrum doppler signal (left) and to acquire secondary information such as a blood flow rate, a blood pressure, and heart rate variability (HRV) based on the blood flow velocity information.

According to the embodiment, the processing unit 220 may determine the presence or absence of a vascular disease such as cerebral infarction, cardiac infarction, and arteriosclerotic diseases based on information such as a blood flow rate, a blood pressure, a blood vessel, an aging degree, and heart rate variability measured by using intravascular imaging results or imaging results related to the body part. For example, the processing unit 220 may determine the presence of a disease or determine that a disease is highly likely to occur when a thickness of the blood vessel shown in the blood vessel segmentation image based on the ultrasonic imaging result is measured as being less than a critical value or when a measurement result of the blood flow rate, the blood pressure, or the heart rate variability is a lowest critical value or less or a highest critical value or more. The determination criteria may be set differently depending on the patient's personal information (age, gender, clinical history in the past, and the like).

According to the embodiment, the processing unit 220 may determine the presence or absence of the disease by collectively considering the intravascular imaging result related to several different body parts. The patient with the vascular disease at a particular site is highly likely to have an abnormal symptom in a blood vessel at another site spaced apart from the corresponding site. For example, according to the statistics, the patient with cerebral infarction often has not only cerebrovascular diseases but also vascular diseases of other organs, and a rate of relapse of cerebral apoplexy is high when there is an abnormality according to the result of the heart ultrasonic diagnosis (when an area of the heart blood vessel is small, a blood flow rate is decreased, or a blood pressure is increased). Therefore, it is possible to collectively consider the imaging results related to other body parts as well as the corresponding body part in order to accurately perform the diagnosis. For example, not only the cerebral blood vessel imaging result but also the cardiovascular imaging result may be considered to determine the presence or absence of cerebral infarction. In this case, different weight values may be applied to the imaging result related to the body part in accordance with the type of disease to be diagnosed. The weight value may be set differently depending on a distance between the body parts, the patient's age, gender, clinical history in the past, and a degree that affects a particular disease.

The output unit 230 may output the imaging result related to the body part and acquired by the processing unit 220. Further, the output unit 230 may be configured to output a warning message related to the disease when the processing unit 220 determines that the disease is present. The output result may be outputted through a display device such as a display provided on the terminal 20.

Hereinafter, a structure of the patch type ultrasonic transducer capable of coming into close contact with the body part will be described with reference to FIGS. 6 and 7.

FIG. 6 is a view illustrating a cross-section of a multichannel ultrasonic transducer array constituting the attachable ultrasonic output patch according to the embodiment. The multichannel ultrasonic transducer array 111 according to the embodiment may be integrated on a substrate 1110 made of a flexible material bendable to conform to a curved shape of the body part.

A process of manufacturing the ultrasonic transducer array 111 according to the embodiment will be briefly described below.

First, flexible material layers 1111 are formed on the substrate 1110 made of a flexible material. For example, the flexible substrate 1110 and the material layer 1111 may be made of an elastic polymer containing polydimethylsiloxane (PDMS), polyurethane, polyester, or a mixture thereof. According to the embodiment, the substrate 1110 may be made of a material having a larger coefficient of thermal expansion than a material of the material layer 1111, and the ultrasonic output patch having a curvature may be manufactured as the substrate 1110 is bent by being heated during the manufacturing process.

Next, ultrasonic transducer elements 1112 are arranged on the flexible material layers 1111. The ultrasonic transducer element 1112 may be, but not limited to, an ultra-small ultrasonic transducer such as a CMUT or a PMUT as described above.

Next, to protect the ultrasonic transducer elements 1112, a plurality of trench structures is formed by performing masking processing using a material such as a photoresist and then etching the flexible material layers 1111. After the mask is removed, the flexible material layers 1111 and the ultrasonic transducer elements 1112 are covered by a material 1113 made of another elastic polymer and then heated, such that the ultrasonic transducer array 111 having the flexible structure is manufactured. A thickness T of the ultrasonic transducer array 111 is at a level of several millimeters, such that the ultrasonic transducer array 111 is provided in the form of a very thin patch.

FIG. 7 is a view illustrating a state in which the multichannel ultrasonic transducer array illustrated in FIG. 6 comes into contact with the body part and outputs imaging ultrasonic waves toward a target position. As illustrated, the ultrasonic transducer array 111 may be made of a flexible material and come into close contact with the skin, and the ultrasonic transducer element 1112 may output imaging ultrasonic waves toward a target position O such as a lesion in the body, blood vessel, or tissue. As described above, the use of the ultrasonic transducer provided in the form of a flexible patch enables long-term ultrasonic monitoring without causing a feeling of irritation to the patient, which makes it possible to recognize, in real time, the state in the body or the presence or absence of a disease.

According to the ultrasonic diagnosis system described above, it is possible to simultaneously acquire images of several body parts (a transcranial part, a carotid artery, a heart, a peripheral artery, and the like) by using the attachable ultrasonic output patches and output the images to the terminal, and it is possible to determine the presence or absence of a vascular disease, such as cerebral infarction, cardiac infarction, or arteriosclerosis, or predict a likelihood of the disease by individually or collectively considering imaging results related to the body parts.

While the present disclosure has been described above with reference to the embodiments, it may be understood by those skilled in the art that the present disclosure may be variously modified and changed without departing from the spirit and scope of the present disclosure disclosed in the claims.

DESCRIPTION OF REFERENCE NUMERALS

11, 12, 13, 14, . . . , and 1n: Ultrasonic output patches
111: Multichannel ultrasonic transducer array
112: Signal processing module
113: Communication module
114: Power source unit
115: Memory unit
20: Terminal
210: Data receiving unit
220: Processing unit
221: Machine learning algorithm
230: Output unit

What is claimed is:

1. A diagnosis system using an attachable ultrasonic output patch, the diagnosis system comprising:
    a plurality of ultrasonic output patches configured to be attachable to different body parts;
    a data receiving unit configured to receive data transmitted from the plurality of ultrasonic output patches;
    a processing unit configured to acquire an imaging result related to a body part by processing the data; and
    an output unit configured to output the imaging result related to the body part,
    wherein each of the plurality of ultrasonic output patches comprises:

a multichannel ultrasonic transducer array configured to output imaging ultrasonic waves toward the body part and receive reflected ultrasonic waves;

a signal processing module configured to process a signal transmitted to or received from the multichannel ultrasonic transducer array; and a communication module configured to transmit a signal processing result, which is acquired by the signal processing module, to the data receiving unit, wherein the processing unit is configured to:

acquire an intravascular imaging result related to the body part using a machine learning algorithm, and determine a presence or absence of a disease by collectively analyzing the intravascular imaging result related to the body part and intravascular imaging results related to the different body parts acquired by using the machine learning algorithm, wherein the processing unit is further configured to:

extract a blood vessel segmentation image from the imaging ultrasonic waves, acquire the intravascular imaging result from the blood vessel segmentation image, and apply different weight values to the intravascular imaging results related to the different body parts to determine the presence or absence of the disease, the weight values being set differently based on a distance between the body parts, patient's personal information, and a degree to which a particular disease affects the different body parts.

2. The diagnosis system of claim 1, wherein the multichannel ultrasonic transducer array is integrated on a substrate made of a flexible material bendable to conform to a curved shape of the body part.

3. The diagnosis system of claim 1, wherein the processing unit is configured to determine the presence or absence of the disease based on at least one of a blood flow rate, a blood pressure, an aging degree of a blood vessel, and heart rate variability measured by using the intravascular imaging result related to the body part.

4. The diagnosis system of claim 3, wherein the output unit outputs a warning message related to the disease when the processing unit determines that the disease is present.

5. The diagnosis system of claim 1, wherein the different body parts are transcranial parts, carotid artery parts, heart parts, or peripheral artery parts.

\* \* \* \* \*